UNITED STATES PATENT OFFICE 2,441,950

MANUFACTURE OF ULTRAMARINE

Alling P. Beardsley, Plainfield, and Stanley H. Whiting, Martinsville, N. J., assignors to American Cyanamid Company, New York, N. Y., a corporation of Maine No Drawing. Application July 24, 1945, Serial No. 606,886

16 Claims. (Cl. 106—305)

This invention relates to an improvement in the manufacture of ultramarine.

The current commercial process for producing ultramarine of high sulfur content and high strength involves two steps which are carried out in a single operation. In the first stage the ultramarine raw mix, which normally contains china clay, silica, soda ash, sulfur and a carbonaceous reducing agent, usually pitch or rosin, is thoroughly mixed by grinding the ingredients together in a ball mill or other comminuting apparatus. The finely ground charge is then loaded into crucibles and the crucibles then stacked in a furnace. The furnace is then fired to produce primary ultramarine which is dull and weak. The crucibles prevent any large portion of the combustion gases from contacting the ultramarine raw mix during the firing stage. The firing therefore proceeds with the ultramarine maintained in an atmosphere which is only partially contaminated with reactive constituents of the furnace gases, such as oxygen, water vapor, and carbon dioxide. The primary ultramarine is then oxidized in the second stage to secondary ultramarine with the loss of some one-seventh to one-eighth of the combined sodium content of the primary ultramarine. This results in the conversion of all of the sodium polysulfide present into sodium sulfate. In the commercial process used hitherto this second oxidation step has physically been incorporated into the same operation as the production of primary ultramarine. The crucibles are not removed from the furnace but the latter is permitted to cool down very slowly over a period of weeks so that oxygen can slowly diffuse through the walls of the crucible, which are of carefully controlled porosity. In our copending application Serial No. 606,888, filed July 24, 1945, we have described an improvement on the single operation process in which the first step of producing primary ultramarine is carried out in impervious or substantially impervious containers and then after cooling the ultramarine is transferred into containers or other apparatus for the oxidizing step. These impervious containers admit either no combustion gases or such small amounts thereof as to produce no noticeable chemical effect. In each process the first step of producing primary ultramarine requires the filling of crucibles and then their emptying. This has presented a number of serious problems.

Throughout the specification and claims the term "primary ultramarine" will be used to cover the product obtained in the first firing stage up to about 750° C. before oxidation. The ultramarine produced in the first stage and which is referred to as primary ultramarine is a blue pigment although dull and of no strength. The contents of a crucible appear green because the blue primary ultramarine is mixed physically with yellow sodium polysulfides formed in the firing. Similarly in the specification and claims the terms "secondary ultramarine" will be used to cover the blue pigment obtained by oxidation of the primary ultramarine. The two terms above defined will be used in no other sense.

The first problem, which is common both to the process ordinarily used up to now and to our improved two-step process, is the dust hazard. The finely divided material dusts badly when being loaded into the crucibles and special dust-handling equipment is required in order to protect the workers' health. This adds to the cost of the operation, and even with good dust-handling equipment presents some working difficulties.

The second disadvantage, which is also common to both the single operation process used hitherto and our improved two-step process, results from the fact that during the first firing, which produces the primary ultramarine, the temperature is so high, about 750° C., that the charge cakes together to a considerable degree. As a result the contents often do not drop out readily on over-turning the crucible, which is necessary in either process. It is customary practice today to rap the crucible vigorously in order to knock loose adhering cake. This shortens the life of the crucible and results in considerable breakage. Since ultramarine is a product which is sold in large volume at a small margin of profit the additional cost thus introduced is a serious matter. In our improved two-step process this factor is even more serious, because we prefer to use crucibles of impervious ceramic ware, which are more expensive than the ordinary crucibles used in the single operation process. The loss in breakage and shortening of life of the crucibles is therefore even more serious in our improved process than in the one used up to the present time.

Another problem which is very serious in the case of the single operation process lies in the fact that unless each charge is compacted in the crucible and compacted very uniformly, the charge will be both uneconomically small and the resulting ultramarine will not be uniform. If the packing is too loose over-oxidation will result in the second step, in which the primary ultramarine is oxidized to secondary ultramarine by diffusion of oxygen. If the charge is packed too tightly some of the middle of the charge will be under-oxidized and weak. In practice it has been found impossible to pack with absolute uniformity and in every commercial batch there will be some crucibles with over-oxidized ultramarine and some with under-oxidized. The irregularity of the product produced not only reduces output of good ultramarine but adds to the difficulties in blending to get uniform shades for the final product.

The effect of packing is not as serious in the two-step process of our copending application above referred to, particularly when sulfur dioxide is used as the oxidizing agent for the second step, as is described and claimed in our copending application Serial No. 606,887 filed July 24, 1945. In this latter case the material is removed and rearranged for the oxidation step and it does not make any difference what the packing was. Therefore, all of the crucibles can be packed as tight as possible without concern with possible under-oxidation. While the packing problem is not quite as serious with our improved two-step process, the additional labor cost involved in the careful packing is an added cost in either process.

The present invention avoids all of the difficulties involved in the packing of crucibles by briquetting the finely ground mix. The briquets can be loaded into crucibles by pouring, without additional labor or devices for packing, the density of the charge may be maintained constant, and a uniform weight of charge per unit volume is obtained. Of course the dust problem is entirely eliminated. It might be supposed that the use of briquets would be unsuitable, particularly in the single operation process, because in the oxidation step in which the primary ultramarine is transformed into secondary ultramarine it might be thought that the oxidizing gases would not penetrate satisfactorily into the center of the hard briquets. However, this has proved to be no problem at all. Evidently in the first firing step the loss of material due to the evolution of $CO_2$, $H_2S$, $H_2O$, sulfur vapor etc., results in sufficient porosity so that an even oxidation is possible. The briquets do not stick together but pour out of a crucible at the end of the firing process without sticking and without the crucible having to be rapped.

If the present invention permitted the production of ultramarine of comparable quality to that produced from the finely divided mix under standard procedure, it would represent a considerable advance in the ultramarine process. As a matter of fact the present process results in the production of an ultramarine which is actually stronger than that normally produced when the mix is loaded into crucibles in unbriquetted form. In the case of the standard single operation process used up to the present time this increase in strength will normally be from 5 to 15%. We are unable definitely to give the reason for this increase in strength. It is possible that it may be due to more complete interaction of the ingredients due to their greater proximity and to a maintained uniform distribution of voids, for we have found to our surprise that the briquets do not sinter together or even shrink in firing. Therefore, the proportion of voids to solids remains the same throughout the operation and permits an easy diffusion of oxidizing gases to the whole of the charge. Although we believe that this uniformity is probably an important contributing factor, and perhaps the main factor determining the higher strength, it is not desired to limit the present invention to any theory of why stronger ultramarine can be produced.

The actual briquetting does not present any serious problem, and it is an advantage of the present invention, therefore, that many well known briquetting procedures can be employed. A few representative methods are the following:

(a) If the loose mix is merely subjected to sufficient pressure in a die or mold, it will form a strong briquet or block. The density of the briquet will vary with the pressure. For example, with one standard ultramarine mix, the density of the briquets varied from 1.27 to 1.53, depending on the pressure.

While sound briquets are made merely by pressing dry mix, the method has some disadvantages. Heavy pressure is required. Also, the air enclosed in the mix must of course escape, and if it is forced to leave too rapidly, it will carry away considerable quantities of the mix with it. Therefore, the compression of the mix must be carried out relatively slowly. The method is rather more suited to a plunger type press than to a roll press, though it can be carried out in the latter if the rolls are fed under pressure.

(b) The addition of water as a lubricant increases the ease of briquetting. A mix moistened with water can readily be briquetted on a roll press, though more than one pass will usually be required. A suitable amount of water is from 4 to 12% by weight of the mix. The greater the amount of water, the less the number of passes required through a roll press.

Briquets formed with the help of water should be dried immediately, as otherwise hydration of the sodium carbonate of the mix occurs, and the swelling thereby caused results in weakening or disintegrating the briquet.

(c) If an organic binder or lubricant is used, the mixture can be readily briquetted on a roll press. For example, 5 to 10% of an oil such as kerosene may be used.

(d) A water-soluble binder or lubricant may be used, preferably mixed with water. An example of such a binder of the organic type is glutrin, the material obtained from sulfite pulp waste liquor. An example of the inorganic type is a sodium silicate. When binders are chosen which will leave a carbonaceous or an inorganic residue, consideration must be given to the effect which such material may have upon the performance of the ultramarine mix. For example, the carbonaceous residue left by glutrin would substitute in some degree the rosin or pitch of the charge. The sodium and silica of the silicate would substitute their equivalents in the charge.

(e) The mix may be made to form its own binder by heating to the requisite temperature. An ultramarine mix will contain from 25 to 35% of sulfur, and from 3 to 5% of rosin or pitch. The latter two melt below 100° C., and the sulfur in the neighborhood of 119° C. If, therefore, the mix is heated to the melting point of sulfur, all of the latter or as much as necessary will be converted to the fluid form, and together with the melted rosin or pitch will act as a lubricant or binder. The mix, heated to the necessary temperature as indicated, is briquetted very nicely on a roll press.

The invention will be described in greater detail in conjunction with the following specific examples which illustrate a typical process.

Example I

A mixture was made of the following composition:

| | Parts |
|---|---|
| Dried china clay | 115 |
| Diatomite | 29 |
| Soda ash | 110 |
| Sulfur | 120 |
| Rosin | 13.6 |

This was ground in a pebble mill loaded with 2" pebbles for a period of four hours. The powdered mix was then briquetted dry in a plunger press. Firm hard briquets were made, the density depending on the pressure applied. The relation between pressure and briquet density was the following:

| Pressure—lb./sq. in. | 380 | 765 | 1530 | 2300 |
|---|---|---|---|---|
| Briquet density | 1.28 | 1.35 | 1.42 | 1.53 |

Example II

Using the same ground mix as in Example 1, briquets were formed dry in a plunger press under pressures of respectively 1375 and 2750 lb. per sq. in. Into three separate fused silica crucibles were put (a) some of the loose mix from which the briquets had been formed, (b) the briquets formed under 1375 lb., and (c) those formed under 2750 lb. All three containers were fired simultaneously in the same furnace, the temperature reaching 700° in seven hours and being held there two hours. After cooling, the three primary ultramarines were washed free from sodium polysulfides, and put into fused silica containers in the form of a coarse powder. While the containers were being heated to 250° C., nitrogen was passed through to displace the air. Then sulfur dioxide was passed through for two hours at a temperature between 225° and 275°. The resulting secondary ultramarines were washed, ground and dried.

The average strengths of the ultramarines from the three successive series, each series carried out as above described, were as follows, compared with the same ground mix fired loose.

| Loose Mix | 1,375 lb. Briquet | 2,750 lb. Briquet |
|---|---|---|
| 100 | 114.5 | 119.7 |

Example III

A mixture was made of the following composition:

| | Parts |
|---|---|
| Dried china clay | 115 |
| Diatomite | 13 |
| Soda ash | 100 |
| Sulfur | 115 |
| Rosin | 11.2 |

This was ground in a pebble mill for four hours. 100 parts were then put into an edge runner mill, 12 parts of water added and the two blended for 10 minutes. The moist mix was then passed once through a roll briquet press, and the product of the first pass put through again. About 85% to 90% of the mix was converted into briquets on the second pass. After screening, the briquets were immediately put into a shelf dryer and dried at about 100° C. Their density was about 1.80 after drying.

The briquets were charged into impervious crucibles which were then covered with ceramic plates. The crucibles were heated to 765° during 8 hours and held there about 5 hours. The crucibles were then allowed to cool and when cold, the primary ultramarine briquets were removed.

The primary ultramarine briquets were put into a container, heated to about 500°, and sulfur dioxide passed in at that temperature, till oxidation was complete. The oxidized blue was washed, ground, and dried. The average strength of six successive batches was 190% of the strength obtained in the factory from a similar mix, charged into crucibles in the loose form.

Example IV

A mixture was made of the composition:

| | Parts |
|---|---|
| Dried china clay | 115 |
| Diatomite | 26 |
| Soda ash | 108 |
| Sulfur | 129 |
| Rosin | 13 |

This mixture was ground, briquetted with the help of water, and dried as described in the previous example.

Duplicate ultramarine furnaces were loaded to two-thirds of their capacity with crucibles containing loose mix, and to the remaining one-third with the same sort of crucibles containing the briquets above described. The furnaces were fired and cooled in the ordinary way.

The ultramarines from the loose mix and from the briquets were carried separately through the steps of washing, grinding and drying. The strength of the ultramarine from the briquets was 135% of that from the loose mix of these particular furnaces. At the same time, the ultramarine from the briquets was the clearer blue.

While the density of the briquet is not critical, and various densities have been described above, we prefer to use briquets which have a density of at least 1.2.

The terms "primary ultramarine" and "secondary ultramarine" are used in the ordinary sense, namely, to cover respectively the product obtained in the first firing stage of the reaction before oxidation, and the final product after oxidation.

We claim:

1. In a process for producing "primary ultramarine" which comprises the step of firing an ultramarine raw mix in an atmosphere relatively free from reactive gases, the improvement which comprises forming the ultramarine mix into strong briquets before subjecting them to said firing step.

2. In a process for producing "primary ultramarine" which comprises the step of firing an ultramarine raw mix in an atmosphere relatively free from reactive gases, the improvement which comprises forming the ultramarine mix into strong briquets having a density of at least about 1.2 before subjecting them to said firing step.

3. In a two-step process of producing "secondary ultramarine" in which an ultramarine raw mix is fired to produce a "primary ultramarine" in an atmosphere substantially completely free from reactive gases, followed by cooling and oxidation to "secondary ultramarine" until the "secondary ultramarine" has acquired its greatest intensity of coloration, the improvement which comprises forming the ultramarine mix into strong briquets before subjecting them to said firing step.

4. In a two-step process of producing "secondary ultramarine" in which an ultramarine raw mix is fired to produce a "primary ultramarine" in an atmosphere substantially completely free from reactive gases, followed by cooling and oxidation to "secondary ultramarine" until the "secondary ultramarine" has acquired its greatest intensity of coloration, the improvement which comprises forming the ultramarine mix into strong briquets having a density of at least about 1.2 before subjecting them to said firing step.

5. A method according to claim 1 in which a binder is added to the ultramarine mix prior to forming said mix into briquets.

6. A method according to claim 2 in which a binder is added to the ultramarine mix prior to forming said mix into briquets.

7. A method according to claim 3 in which a binder is added to the ultramarine mix prior to forming said mix into briquets.

8. A method according to claim 4 in which a binder is added to the ultramarine mix prior to forming said mix into briquets.

9. A method according to claim 1 in which the briquets are prepared by using water as a binder for the ultramarine mix, followed by immediate drying before substantial hydration of any of the substituents of the mix results.

10. A method according to claim 2 in which the briquets are prepared by using water as a binder for the ultramarine mix, followed by immediate drying before substantial hydration of any of the substituents of the mix results.

11. A method according to claim 3 in which the briquets are prepared by using water as a binder for the ultramarine mix, followed by immediate drying before substantial hydration of any of the substituents of the mix results.

12. A method according to claim 4 in which the briquets are prepared by using water as a binder for the ultramarine mix, followed by immediate drying before substantial hydration of any of the substituents of the mix results.

13. A method according to claim 1 in which the briquets are self bound by heating the mix to the melting point of sulfur before briquetting.

14. A method according to claim 2 in which the briquets are self bound by heating the mix to the melting point of sulfur before briquetting.

15. A method according to claim 3 in which the briquets are self bound by heating the mix to the melting point of sulfur before briquetting.

16. A method according to claim 4 in which the briquets are self bound by heating the mix to the melting point of sulfur before briquetting.

ALLING P. BEARDSLEY.
STANLEY H. WHITING.

REFERENCES CITED

The following references are of record in the file of this patent:

FOREIGN PATENTS

| Number | Country | Date |
|--------|---------|------|
| 9,200 | Great Britain | 1890 |
| 6,959 | Great Britain | 1911 |
| 206,466 | Germany | Oct. 22, 1907 |
| 297,781 | Germany | Sept. 6, 1916 |

OTHER REFERENCES

Manufacture of Colors for Painting, by Riffault et al., 1874, pages 304, 305, 312, and 314.